United States Patent
Houman

[11] 3,909,577
[45] Sept. 30, 1975

[54] PULSE CONTROLLED FLUSHING SYSTEM

[75] Inventor: Leif Houman, Glen Cove, N.Y.

[73] Assignee: Eltee Pulsitron(Entire), West Caldwell, N.J.

[22] Filed: Dec. 11, 1973

[21] Appl. No.: 423,725

[52] U.S. Cl............................................... 219/69 D
[51] Int. Cl.² ............................................ B23P 1/08
[58] Field of Search ... 219/69 D, 69 G, 69 P, 69 M, 219/69 S, 69 V

[56] References Cited
UNITED STATES PATENTS

| | | | |
|---|---|---|---|
| 3,454,737 | 7/1969 | Pfau et al............................ | 219/69 D |
| 3,699,303 | 10/1972 | Kauffman et al.................. | 219/69 D |
| 3,739,136 | 6/1973 | Marendaz.......................... | 219/69 C |

Primary Examiner—Bruce A. Reynolds
Attorney, Agent, or Firm—Clarence A. O'Brien & Harvey B. Jacobson

[57] ABSTRACT

The machining gap between a workpiece and an electrode is flushed by an increased flow of dielectric fluid during timed interruptions in the pulses producing electric discharge through the gap. The flushing period is prolonged until terminated by detection of a drop in voltage across the gap when the electrode re-enters the workpiece following retraction that occurs simultaneously with interruption in the discharge producing pulses.

2 Claims, 2 Drawing Figures

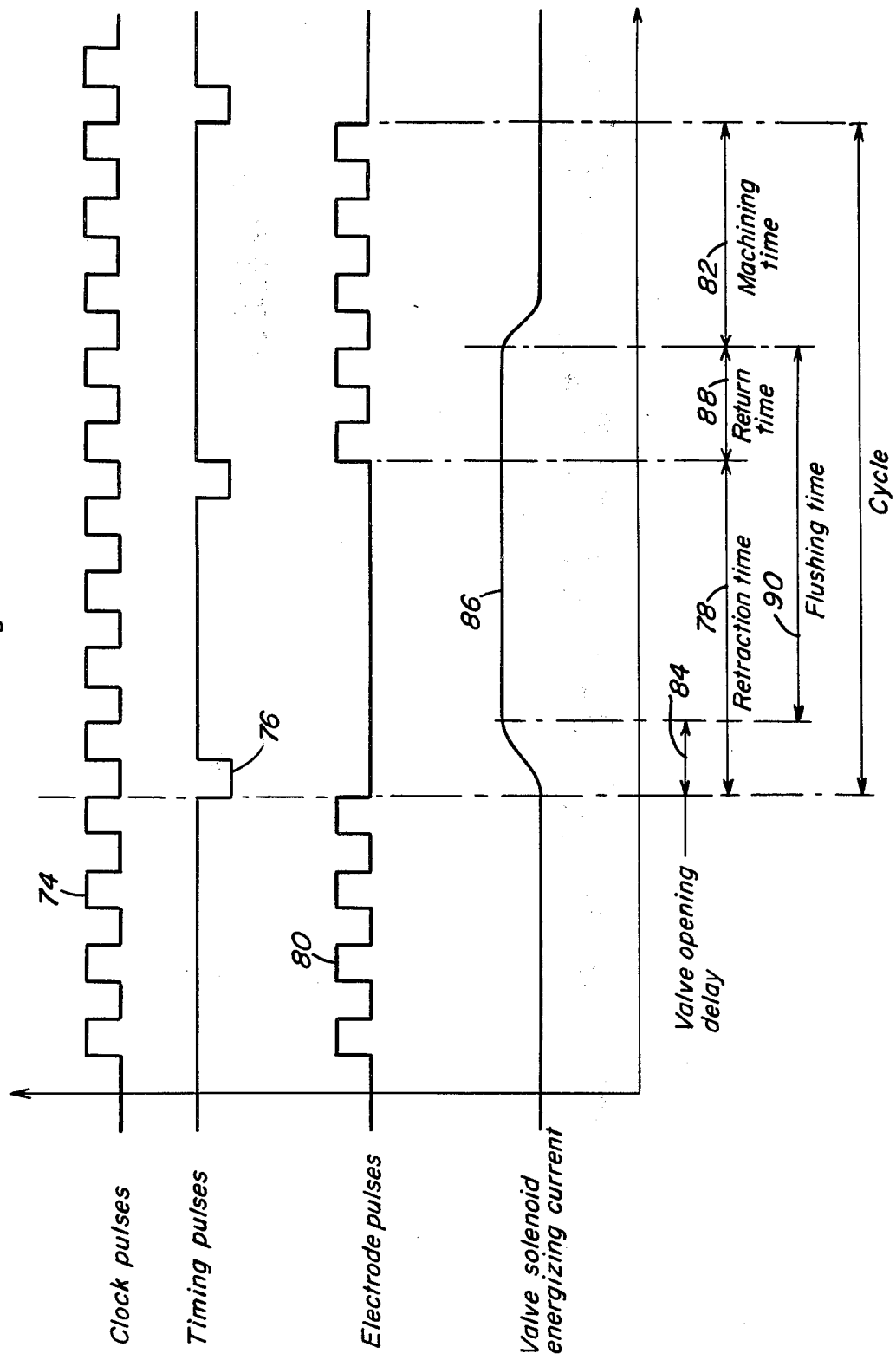

PULSE CONTROLLED FLUSHING SYSTEM

This invention relates in general to machining of workpieces by an EDM system and in particular to the flushing of the machining gap between the workpiece and electrode.

The removal of material accumulated in the machining gap by an increased flow of dielectric fluid during interruptions in the electric discharge current supplied to the workpiece and electrode in an EDM system is well known as disclosed, for example, in U.S. Pat. No. 3,454,737 to Pfau etal. In such systems, the operating current pulses are periodically interrupted and the electrode simultaneous retracted from the workpiece to permit flushing of the machining gap by opening of a valve on command from the timing pulse which cuts off the supply of current and initiates retraction of the electrode. The rate at which material is machined is accordingly reduced by an amount dependent on the duration of the intervals spacing the interrupted current pulses necessary to sufficiently flush the machining gap. The duration of these spacing intervals must, of course, be sufficient to enable the flushing flow of fluid to prevent any build up of material in the gap. Also, because of the time involved in retracting the electrode and returning the electrode to an operative machining position relative to the workpiece, there is a further reduction in the actual machining time box material erosion.

It is therefore a primary object of this invention to maximize the amount of flushing flow initiated during the aforementioned periodic interruptions in machining current so as to achieve the necessary flushing with a corresponding minimum reduction in machining time.

In accordance with the present invention, the increased flushing flow of dielectric fluid is periodically initiated on command of the timing pulses from a timer which simultaneously initials retraction of the electrode from the workpiece. The flushing flow may alternatively be initiated on demand by a command signal from a gap condition detector. This increased flow of fluid flushing the gap is continued beyond the electrode retraction period so as to take advantage of the time it takes the electrode to return and reenter the workpiece. A voltage detector monitors the gap in order to detect reentry or return of the electrode by sensing a voltage drop and signalling a relay to close a valve through which the increased flushing flow of fluid is conducted. The duration of the flushing period is thereby extended beyond the retraction period by a variable amount until the electrode has actually resumed its operating position.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a simplified graphical illustration of various electrical currents produced in the system.

Figure 1:
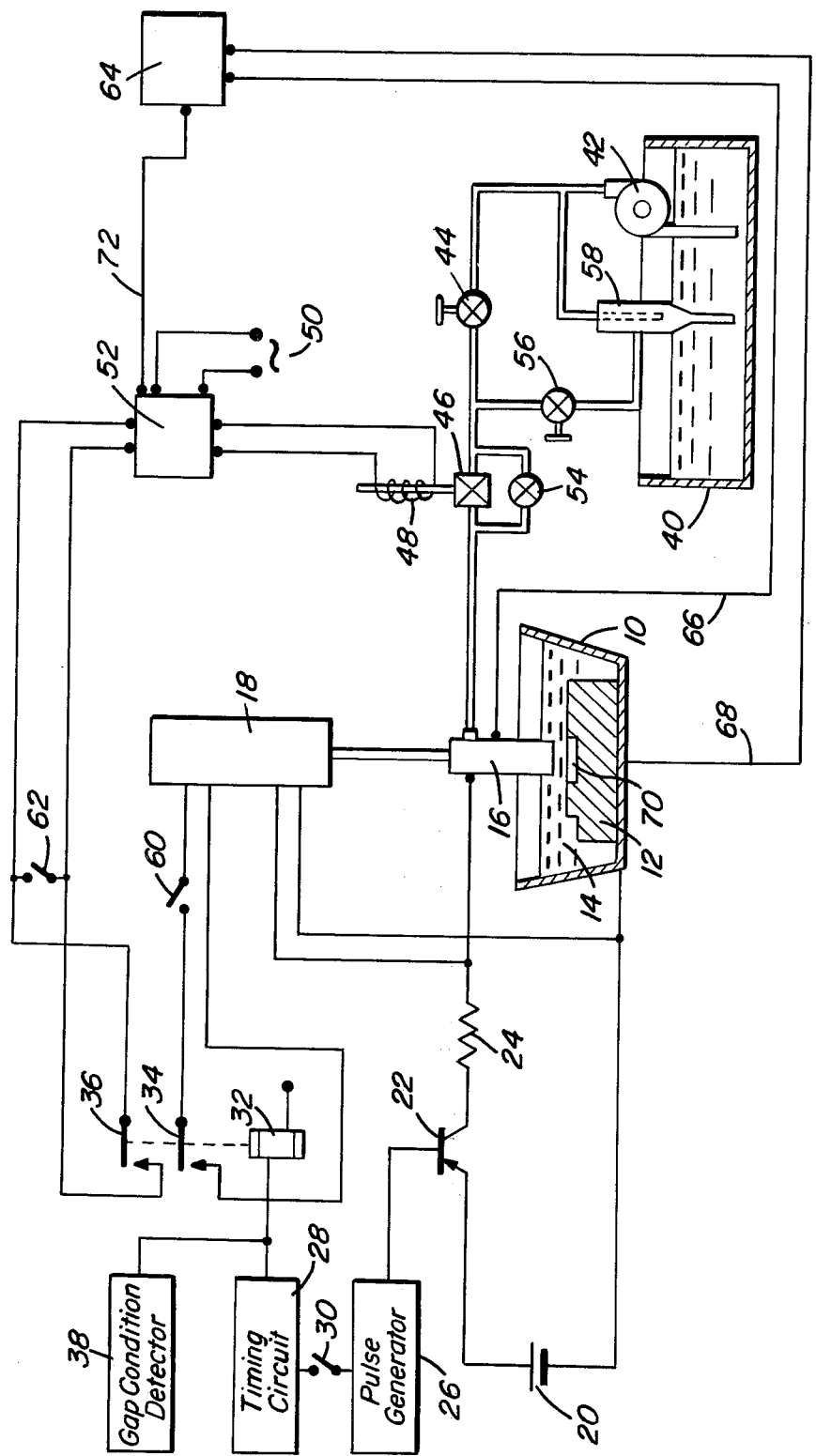
FIG. 1 is a schematic view of the system of the present invention.

Referring now to the drawings in detail, FIG. 1 illustrates a container 10 supporting a workpiece 12 immersed in a body of dielectric fluid 14. The workpiece is to be machined by electric discharges from an electrode 16 operatively positioned relative to the workpiece by a servomechanism 18 to which the electrode is connected. The intermittent machining discharges are derived from a source of direct current 20 to which the workpiece and the electrode are connected through a circuit breaking device such as transistor 22 in series with a current limiting resistor 24. The circuit breaking transistor 22 is controlled by clock pulses of a relatively high frequency supplied to its base from a pulse generator 26, the output of which is controlled by a timing circuit 28 connected to the pulse generator upon closing of switch 30. The relatively low frequency signal output of the timing circuit is also applied to a relay coil 32 for periodic closing of the two normally opened relay switches 34 and 36. Alternatively, the relay coil is energized by the output of a gap condition detector 38 monitoring the spark gap between the electrode and the workpiece in a manner well known by those skilled in the art.

The system illustrated in FIG. 1 further includes a reservoir container for the dielectric fluid which is withdrawn from the reservoir by a pump 42 and conducted to the electrode 16 through a manually controlled valve 44 in series with an electromagnetically operated valve 46. As is well know, the fluid is conducted through passages in the electrode into the machining gap for flushing purposes. Thus, upon opening of valve 44, the supply of flushing fluid in a forced flow mode is controlled by energizing current supplied to the valve operating solenoid 48 from a source of current 50 through a relay 52 in response to signals produced by intermittent closing of relay switch 36. A limited amount of fluid is conducted in by-pass relation to the valve 46 when closed through a by-pass valve 54 to maintain a minimum flow of fluid at all times. Alternatively, flushing may be effected by opening valve 56 and closing valve 44 in order to apply a suction pressure to the electrode 16 thereby drawing fluid through the machining gap from the container 10. The suction pressure is generated by recirculation of fluid through the suction producing device 58 to which the valve 56 is connected. In either case, flow of fluid for flushing purposes is automatically controlled through valve 46 by signals applied to relay coil 32 from either the timing circuit 28 or the gap condition detector 38. These same signals are operative through relay switch 34 to control movement of the electrode through the servomechanism 18. Thus, when switch 60 is closed, intermittent closing of relay switch 34 will cause corresponding retractions of the electrode 16 from the workpiece while relay switch 36 simultaneously causes opening of valve 46 and intermittent flushing of the machining gap by flow of fluid therethrough. Continuous rinsing of the gap by the flushing fluid may be effected by closing of switch 62 short-circuiting relay switch 36. Flow of flushing fluid is furthermore controlled by a voltage detector 64 of any well known type connected to the electrode and workpiece by the conductors 66 and 68 in order to monitor gap voltage. Thus, when the electrode reenters the machined cavity 70 in the workpiece, a voltage drop is detected to supply a signal through conductor 72 to the relay 52 for terminating a flushing cycle by deenergizing the valve operating solenoid 48.

As graphically shown in FIG. 2, the clock pulses 74 produced by the pulse generator 26 are periodically interrupted by the timing pulses 76 from the timing circuit 28 through the circuit breaking transistor 22 so as to establish a retraction interval 78 between pulse trains 80 applied to the electrode during machining intervals 82. Each pulse 76 constitutes a command operative through relay switch 34 to begin retraction of the electrode and at the same time to begin a flushing operation by opening of valve 46 after a predetermined opening delay 84. The command signal may, alternatively, originate from the gap condition detector 38 to provide for additional flushing if called for. The solenoid energizing current 86 as depicted in FIG. 2 is prolonged beyond the retraction period 78 corresponding to the return time 88 for the electrode. Thus, the solenoid energizing current is terminated by a signal from the gap voltage detector only when the electrode has actually reentered the workpiece. The flushing cycle 90 is thereby extended to maximize the amount of flushing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is:

1. Apparatus for machining a workpiece, comprising an electrode spaced from the workpiece to form a gap therebetween, means for supplying current to the electrode to provide intermittent electric discharges across said gap, means for simultaneously retracting said electrode from the workpiece and initiating flushing flow of fluid to flush debris from the gap, timing means for establishing timed retraction periods during which said electrode is retracted and the current to the electrode is interrupted, gap monitoring means for detecting return of the electrode to the workpiece following termination of said timed retraction periods, and means responsive only to said return of the electrode as detected by the gap monitoring means for terminating said flushing flow of fluid which is prolonged belong said retraction periods.

2. The apparatus of claim 1 including means for monitoring gap conditions to generate command signals; and means for increasing said flow of the fluid to obtain additional flushing on demand.

* * * * *